(12) United States Patent
Frederickson

(10) Patent No.: US 6,186,566 B1
(45) Date of Patent: Feb. 13, 2001

(54) LIFTING DEVICE

(76) Inventor: David Frank Frederickson, 4951 Toll Bridge Rd., Belton, TX (US) 76513

( * ) Notice: Under 35 U.S.C. 154(b), the term of this patent shall be extended for 0 days.

(21) Appl. No.: 09/267,352

(22) Filed: Mar. 15, 1999

Related U.S. Application Data

(63) Continuation of application No. 08/812,590, filed on Mar. 7, 1997, now abandoned.

(51) Int. Cl.$^7$ ...................................................... B65G 7/12
(52) U.S. Cl. .............................................. 294/15; 294/26
(58) Field of Search ................................... 294/9, 11, 15, 294/16, 19.1, 26, 27.1, 32, 33, 58, 62; 254/131; D8/14; D34/28

(56) References Cited

U.S. PATENT DOCUMENTS

| | | | |
|---|---|---|---|
| D. 349,437 | * 8/1994 | Mock et al. | 294/15 X |
| 2,428,941 | * 10/1947 | Packard | 294/15 X |
| 2,430,142 | * 11/1947 | Roberts | 294/15 X |
| 2,551,097 | * 5/1951 | Cole | 294/15 X |
| 2,930,583 | * 3/1960 | Noe et al. | 294/15 X |
| 3,203,606 | * 8/1965 | Masterson | 294/15 X |
| 5,069,495 | * 12/1991 | Mears | 294/15 |
| 5,171,052 | * 12/1992 | Cunningham | 294/26 X |

* cited by examiner

Primary Examiner—Johnny D. Cherry
(74) Attorney, Agent, or Firm—Merek & Voorhees

(57) ABSTRACT

A lifting device includes a base comprising a horizontal portion for engagement with the bottom of an object to be lifted and a vertical portion for engagement with the side of the object. A handle is secured to the base and extends vertically upwardly from the vertical portion. A handle grip is mounted on the handle for selective engagement to impose an upwardly directive force on the handle and the base, thereby lifting an object mounted on the base in engagement with horizontal and vertical portions thereof. The handle grip may be selectively positioned or located vertically relative to the base. The handle grip may be tubular in construction to facilitate the receipt of a bar therethrough thereby facilitating lifting by multiple persons. The lifting device maybe provided with brackets, slots, apertures, and/or rings for receiving straps or ropes to secure objects to be lifted to the lifting device.

10 Claims, 10 Drawing Sheets

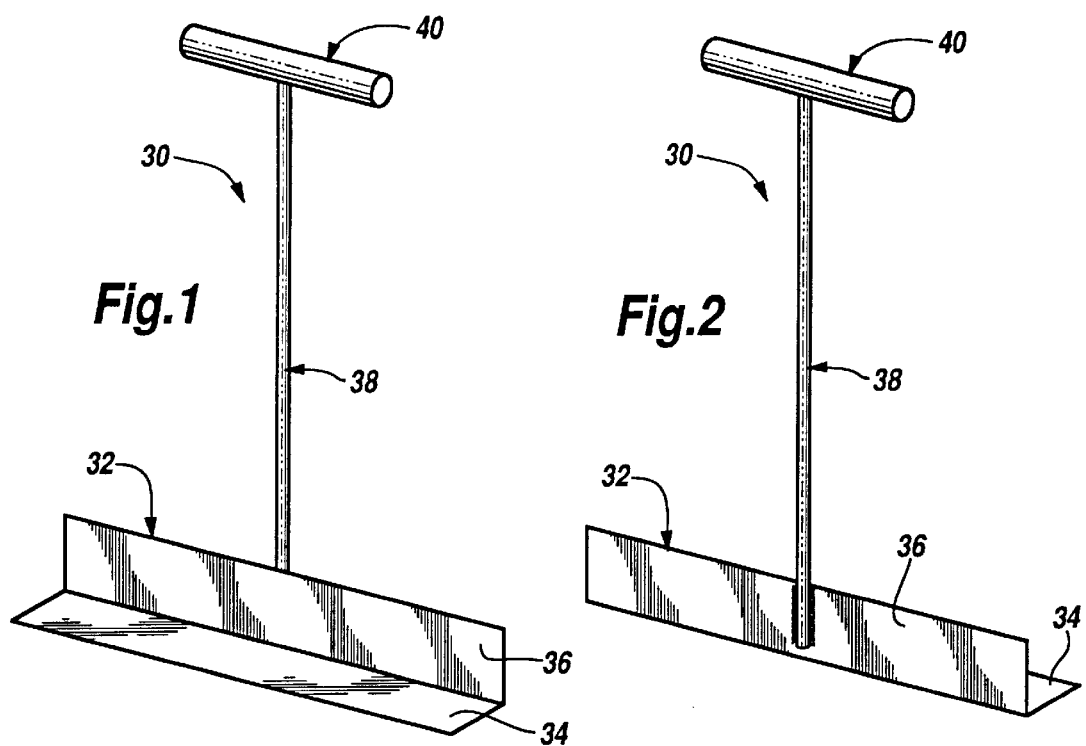
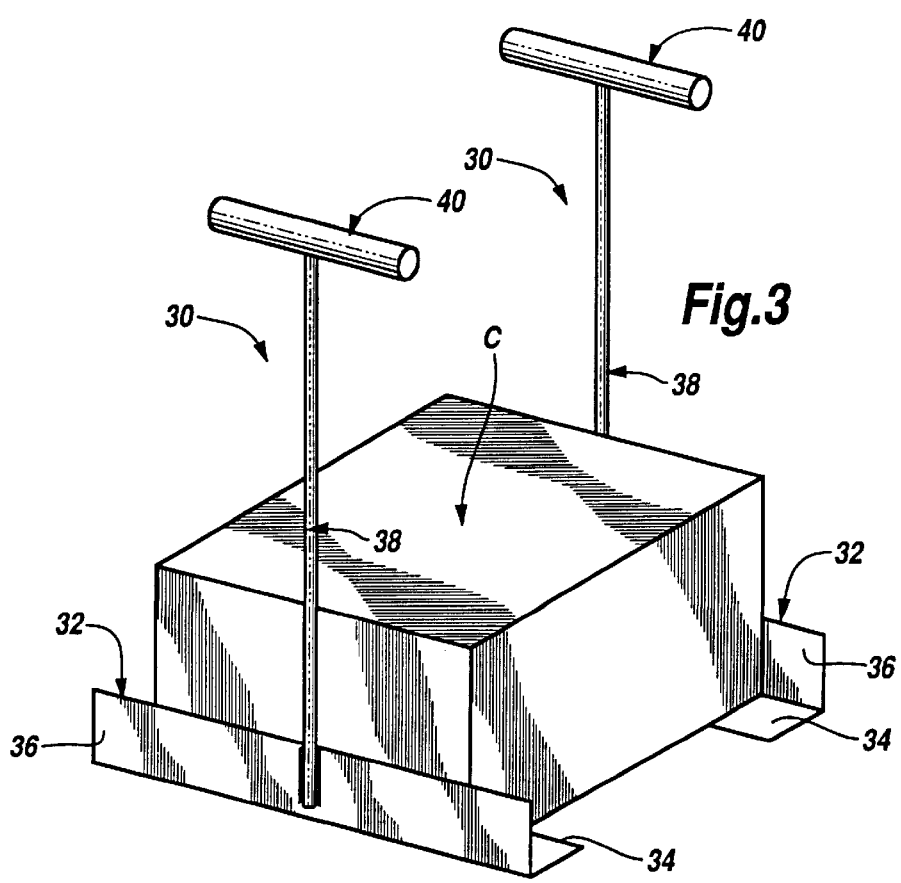

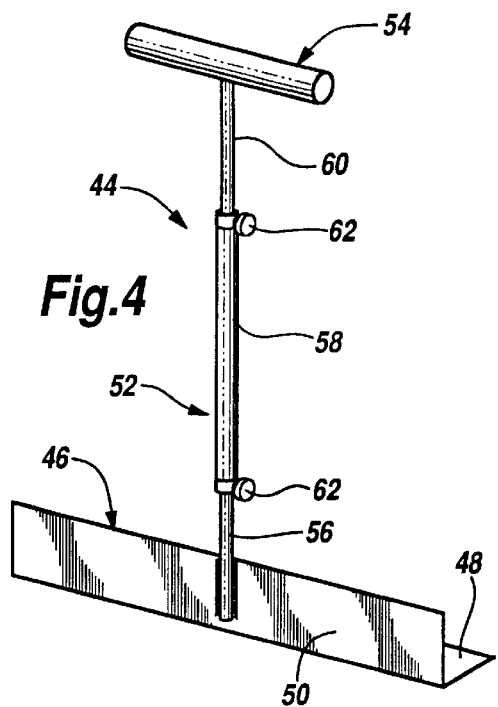
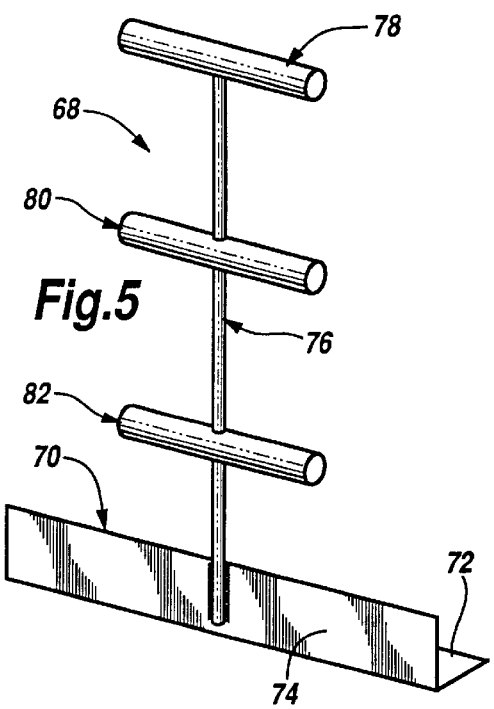
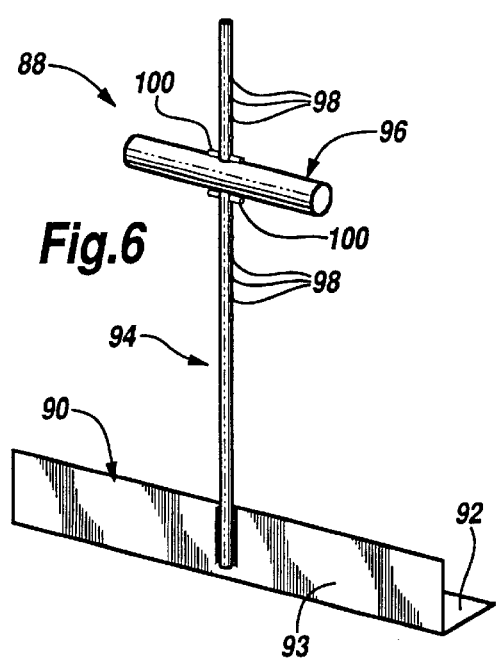
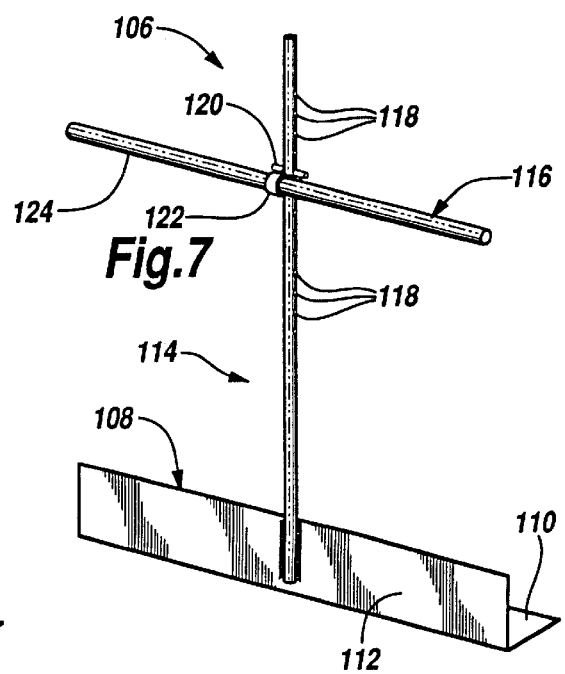

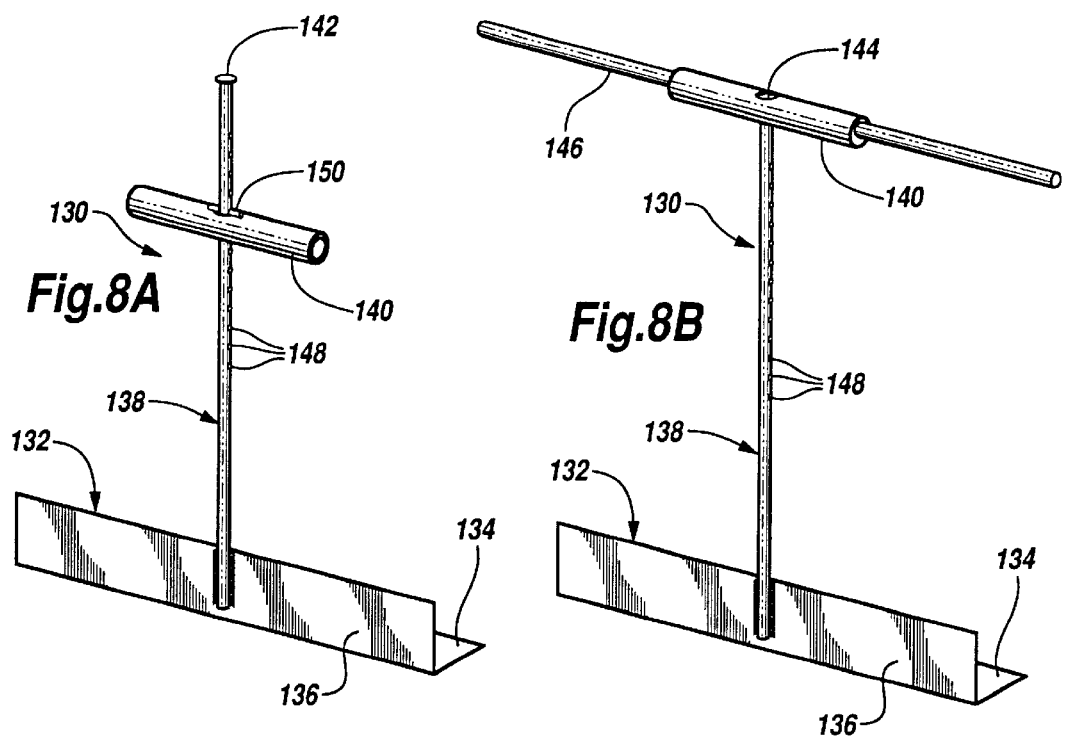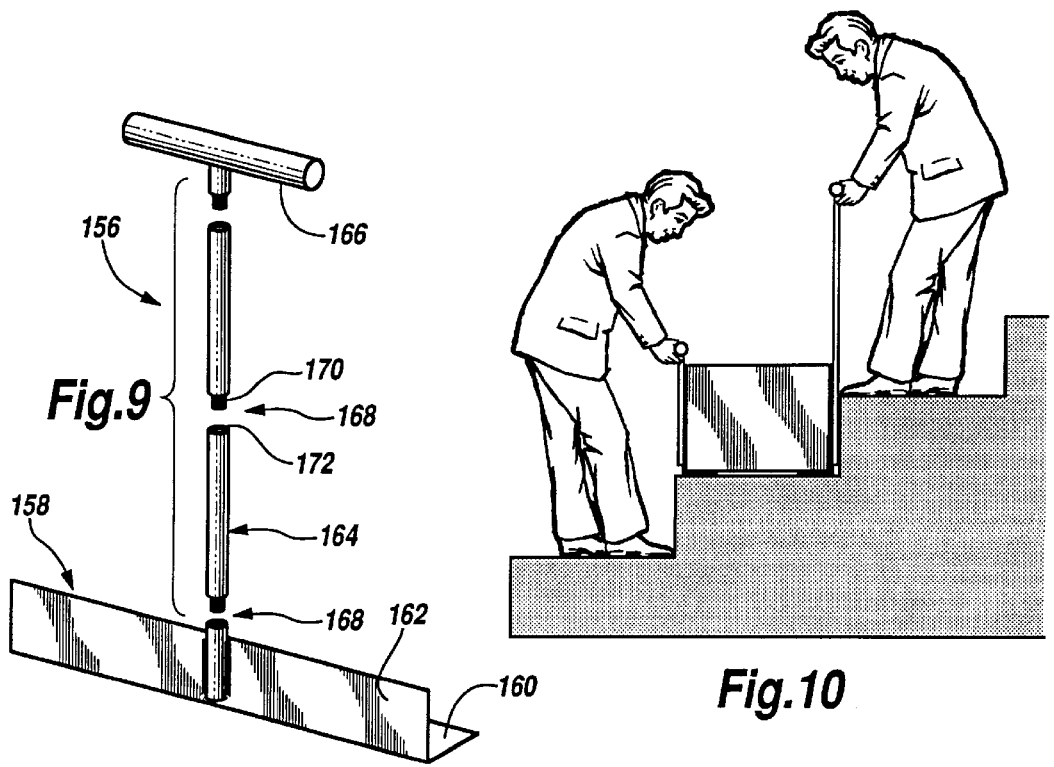

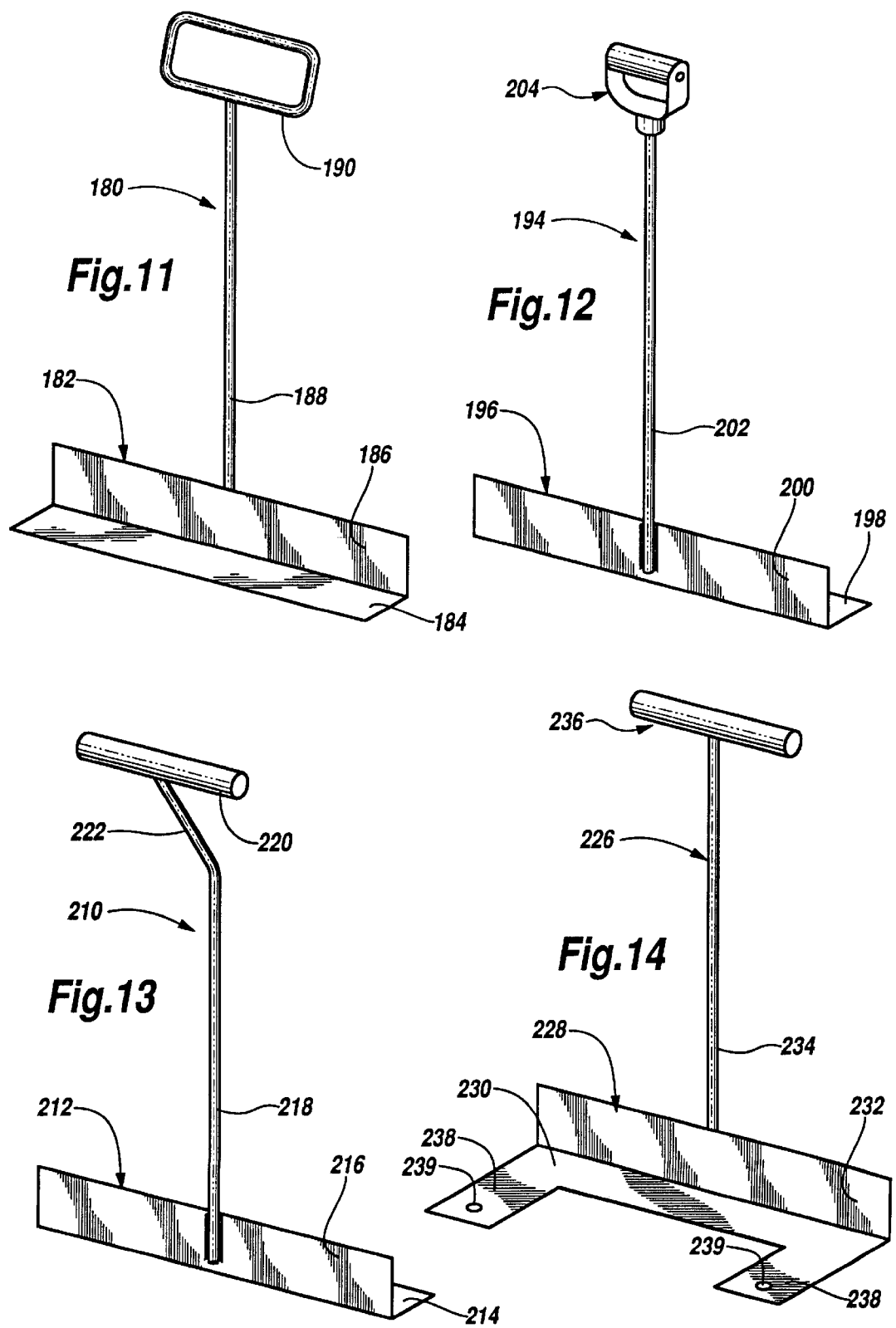

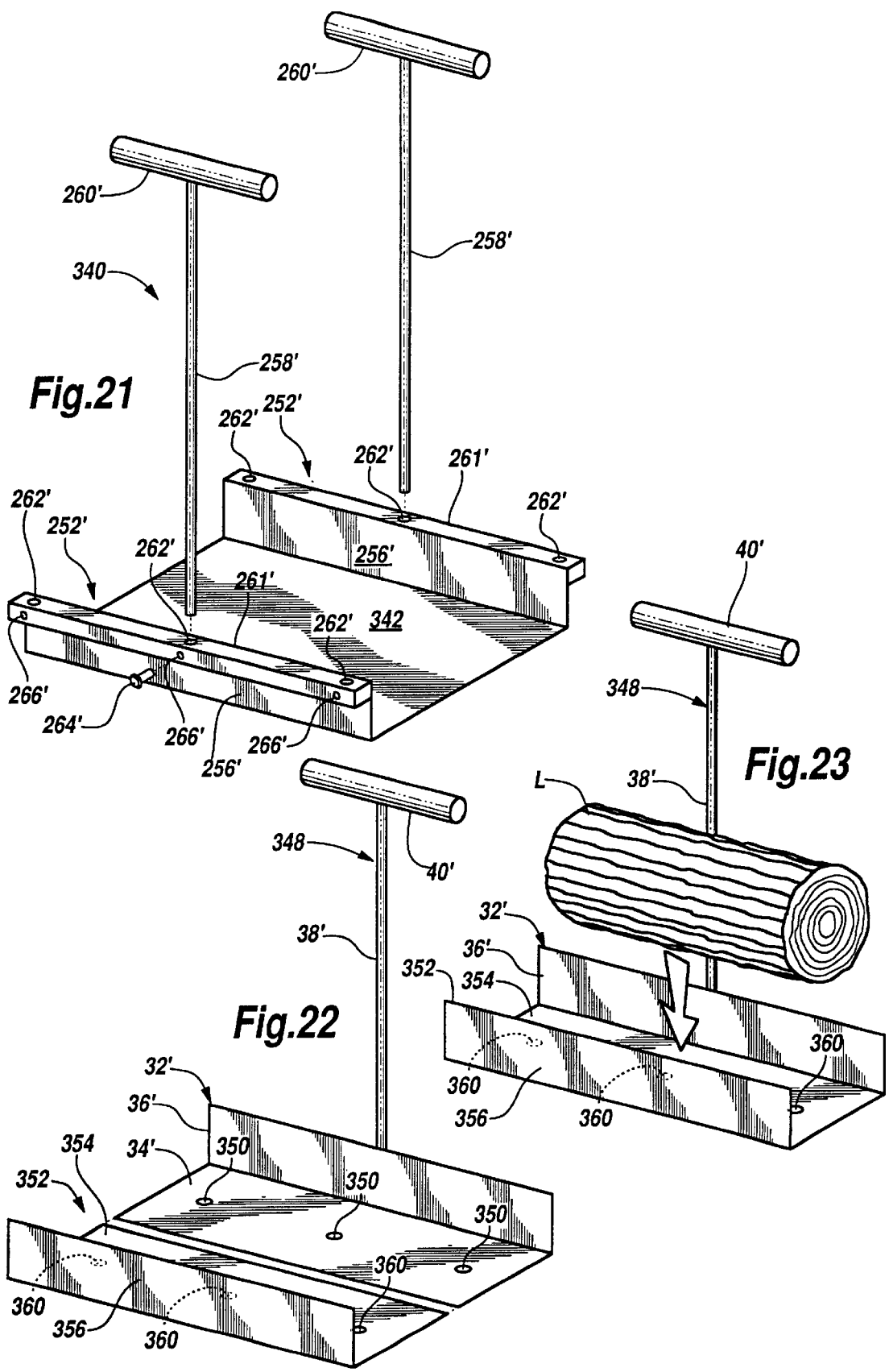

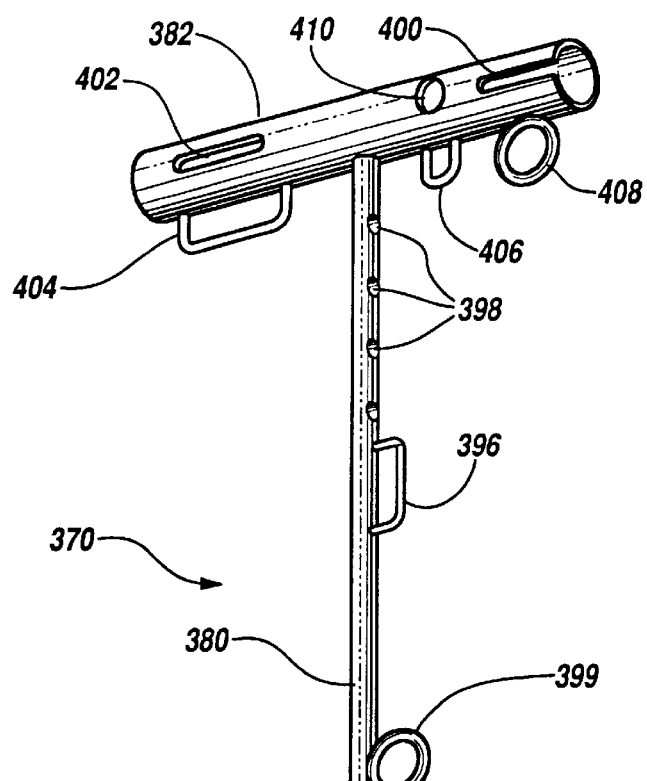
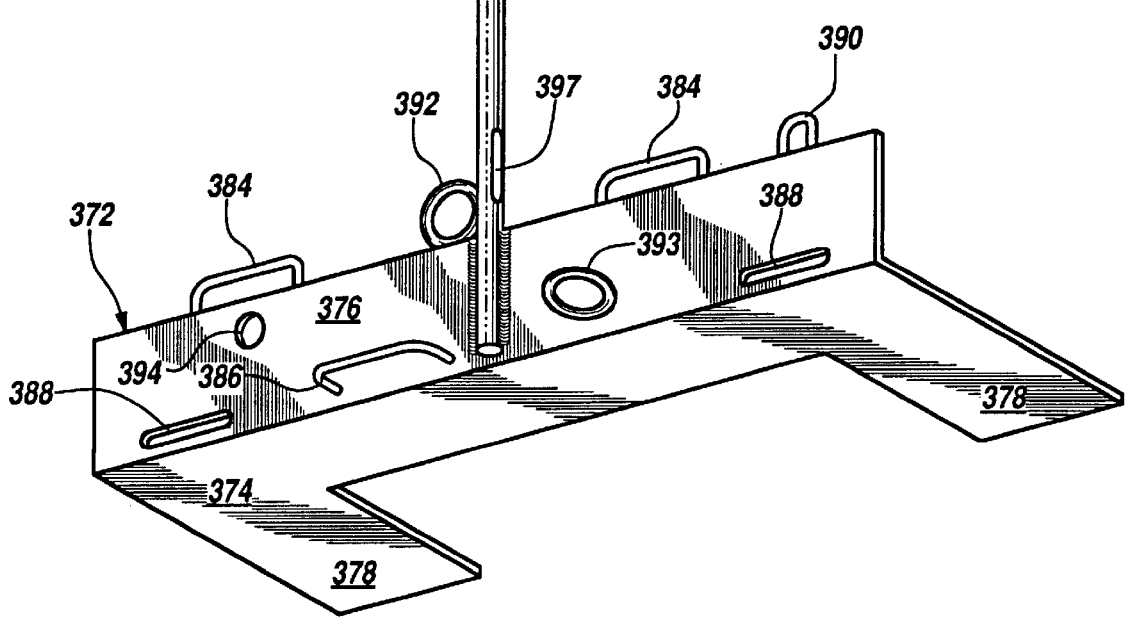
Fig.24

LIFTING DEVICE

The subject patent application is a continuation of U.S. patent application Ser. No. 08/812,590 filed Mar. 7, 1997, now abandoned.

TECHNICAL FIELD

This invention relates generally to lifting devices, and more particularly to manually operable devices which facilitate the lifting and moving of boxes and cartons, appliances, etc.

BACKGROUND AND SUMMARY OF THE INVENTION

Simply put, the human body is not adapted for lifting. For this reason, the improper lifting of even relatively lightweight objects can and does result in severe back injuries, lifetime problems with lower back pain, etc.

Injuries suffered from the improper lifting and movement of heavy objects result in tremendous individual and societal costs, e.g., decreased productivity. The present invention eliminates these problems on the front end by removing the need to engage in the types of lifting and carrying behavior that commonly result in injuries, and integrates injured individuals more fully and quickly into their previous jobs by lessening the physical demands of many employment tasks which involve lifting and carrying. Thus, the extensive use of the invention can result in a more productive work force.

There are over 40 million legally disabled Americans. Many of these are excluded from jobs because they are unable to meet physical requirements which may involve the lifting and moving of heavy objects. The present invention mitigates these problems. The use of the invention makes enormous contributions to the cause of integrating disabled Americans into normal personal and professional lifestyles and jobs which may involve the movement of heavy objects at home and work.

America is an increasingly aging society. Many older Americans are trying to live independently. Living independently often involves moving heavy objects, e.g., dog food, furniture, bags of groceries, etc. By making it easier to lift and move things in and around the home, garden, etc., the use of the invention allows older individuals to live more normal and richer lives and engage in activities which were formerly precluded to them. Because the invention makes it easier to move objects within the home, to and from vehicles, etc., senior citizens can be less dependent on others.

America has a tremendous number of single parent families, many being headed by females. The present invention makes it easier for women to move objects (such as furniture) without the assistance of often hard to find helpers.

By maximizing the use of physical strength, the present invention opens up employment opportunities to millions of Americans that are too weak to lift and carry items in the traditional manner. An example would be a large bag of fertilizer which would be impossible to lift and carry for many people in the current manner.

A fundamental aspect of the invention is that objects can be moved while the arm is fully extended. This enables a person to pick up an object by bending only slightly and straightening up for easier carrying. This is infinitely easier than trying to carry objects when the arm must be bent in order to accomplish the task.

In accordance with particular aspects of the invention, a lifting device includes a base comprising a horizontal portion and a rigidly connected vertical portion. A handle extends upwardly from the vertical portion of the base and is provided with a handle grip. In operation, the lifting device of the present invention is frequently used in tandem, with one lifting device being employed on each side of the object to be lifted and moved. The horizontal portion of the base of each lifting device is positioned under the object, the vertical of the base is engaged with the side of the object, and the handle grips are engaged by persons situated on opposite sides of the object to lift and move the object as desired.

The lifting device of the present invention may be provided with a telescoping handle, or with a selectively positionable handle grip, or with multiple handle grips in order to facilitate the use of the lifting device in the movement of objects up and down stairs, up and down inclined surfaces, etc. and to facilitate the lifting of heavy objects with the arms fully extended. In the case of particularly heavy, bulky, or cumbersome objects to be lifted and moved, the lifting device of the present invention may be adapted for use by more than two persons. The lifting device of the present invention is further adapted for use in conjunction with ropes or straps which function to secure the object to the lifting device during lifting and movement, and may also function to connect two lifting devices one to the other.

BRIEF DESCRIPTION OF THE DRAWINGS

A more complete understanding of the invention may be had by reference to the following Detailed Description when taken in conjunction with the accompanying Drawings, wherein:

FIG. 1 is a front perspective view of a lifting device comprising a first embodiment of the invention;

FIG. 2 is a rear perspective view of the lifting device of FIG. 1;

FIG. 3 is a perspective view illustrating the lifting device of FIGS. 1 and 2 in use;

FIG. 4 is a perspective view illustrating a second embodiment of the invention;

FIG. 5 is a perspective view illustrating a third embodiment of the invention;

FIG. 6 is a perspective view illustrating a fourth embodiment of the invention;

FIG. 7 is a perspective view illustrating a fifth embodiment of the invention;

FIG. 8A is a perspective view illustrating a sixth embodiment of the invention;

FIG. 8B is a perspective view further illustrating the embodiment of the invention shown in FIG. 8A;

FIG. 9 is a perspective view illustrating a seventh embodiment of the invention;

FIG. 10 is a diagrammatic illustration of the use of various embodiments of the invention;

FIG. 11 is a perspective view illustrating a variation of the embodiment of the invention illustrated in FIGS. 1 and 2;

FIG. 12 is a perspective view illustrating a variation of the embodiment of the invention illustrated in FIGS. 1 and 2;

FIG. 13 is a perspective view illustrating a variation of the embodiment shown in FIGS. 1 and 2;

FIG. 14 is a perspective view illustrating a variation of the embodiment shown in FIGS. 1 and 2;

FIG. 21 is a perspective view illustrating a variation of the embodiment of the invention shown FIG. 15;

FIGS. 22 and 23 are perspective views illustrating a variation of the embodiment of the invention illustrated in FIGS. 1 and 2; and FIGS. 24 and 25 are perspective views illustrating accessories which may be utilized in conjunction with any of the foregoing embodiments of the invention to facilitate the use of straps and ropes in conjunction therewith.

DETAILED DESCRIPTION

Figures 15, 16:
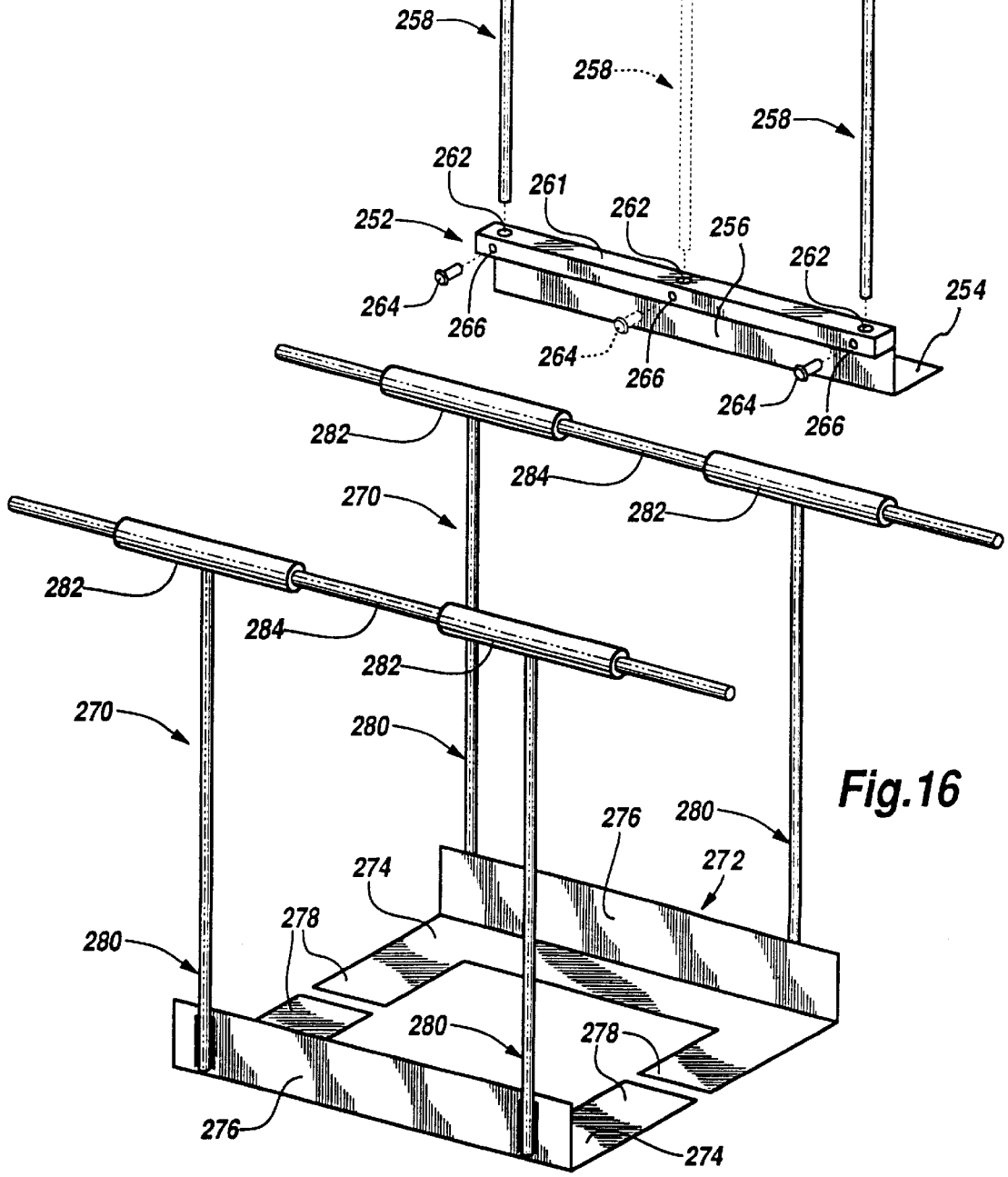
FIG. 15 is a perspective view illustrating an eighth embodiment of the invention.
FIG. 16 is a perspective view illustrating a variation of the embodiment of the invention shown in FIG. 14.

Referring now to the Drawings, and particularly to FIG. 1, there is shown a lifting device 30 comprising a first embodiment of the invention. The lifting device 30 includes a base 32 comprising a horizontal portion 34 and a vertical portion 36 extending substantially perpendicularly to the horizontal portion 34 and rigidly secured thereto. A handle 38 extends upwardly from the base 32 and a handle grip 40 is secured at the upper end of the handle 38.

The base 32 of the lifting device 30 may conveniently comprise a length of steel angle iron. Those skilled in the art will appreciate the fact that the base 32 may be formed from other materials such as titanium, aluminum, brass, bronze, etc. The horizontal portion 34 and the vertical portion 36 of the base 32 may be integrally formed, or they may be separate pieces joined together by conventional techniques such as welding, braising, soldering, or by means of suitable fasteners. Various plastic materials may also be used in the fabrication of the base 32 depending upon the requirements of particular applications of the invention.

The handle 38 is preferably formed from steel, but also may be formed from other metals and/or plastic materials. The handle 38 may be either solid or tubular in construction. As illustrated in FIG. 2, the handle 38 may be secured to the base 32 by welding, braising, or similar conventional techniques. Alternatively, the handle 38 may be secured to the base 32 by means of suitable fasteners.

The handle grip 40 is preferably formed from steel but may also be formed from other metals and/or plastic materials. The handle grip 40 may be either solid or tubular in construction. The handle grip 40 may be secured to the handle 38 by welding, braising, or similar techniques. Suitable fasteners may be used to secure the handle grip 40 to the handle 38, if desired. Alternatively, the handle grip 40 may be threadedly engaged with the handle 38.

FIG. 3 illustrates the use of the lifting device 30. Typically, the lifting device 30 is used in pairs. Each lifting device 30 is engaged with a carton C or other object to be lifted by engaging the horizontal portion 34 of each base 32 with the bottom of the object to be lifted and by engaging the vertical portion 36 of each base 32 with the opposite sides thereof. With the bases 32 of the lifting devices 30 thus positioned, the handles 38 extend vertically along the opposite sides of the object to be lifted, and the handle grips 40 are positioned above the object to be filled.

At this point the handle grips 40 are engaged by two persons, one situated on each side of the object to be lifted. By means of the handle grips 40, the lifting devices 30 are raised sufficiently to just clear the carton C or other object to be lifted from the underlying surface. Once the object is clear of the underlying surface, the lifting device is used to transport the object to the desired location and to orient the object as desired.

Referring to FIG. 4, there is shown a lifting device 44 comprising a second embodiment of the invention. The lifting device 44 is similar in many respects to the lifting device 30 illustrated in FIGS. 1 and 2 and described herein above in connection therewith. Thus, the lifting device 44 includes a base 46 comprising a horizontal portion 48 and a vertical portion 50, a handle 52, and a handle grip 54 secured at the distal end of the handle 52.

The lifting device 44 differs from the lifting device 30 in that the handle 52 thereof is telescoping in nature. The handle 52 includes a lower portion 56 having a relatively small diameter, a tubular mid-portion 58 which receives the lower portion 56 therein, and an upper portion 60 which is also received in the tubular mid-portion 58 of the handle 52. Threaded fasteners 62 or other suitable, conventional apparatus are used to secure the positioning of the lower portion 56 and the upper portion 60 of the handle 52 relative to the mid-portion 58 thereof. In this manner the length of the handle 52 is readily adjusted to suit the requirements of particular circumstances. Those skilled in the art will appreciate the fact that the handle 52 of the lifting device 44 need not comprise a double telescoping arrangement, but can comprise a single telescoping arrangement, if desired.

FIG. 5 illustrates a lifting device 68 comprising a third embodiment of the invention. The lifting device 68 is similar in many respects to the lifting device 30 illustrated in FIGS. 1 and 2 and described hereinabove in connection therewith. Thus, the lifting device 68 includes a base 70 comprising a horizontal portion 72 and a vertical portion 74, a handle 76 secured to and extending upwardly from the base 70 and a handle grip 78 secured at the upper end of the handle 76. The lifting device 68 differs from the lifting device 30 in that the handle 76 is provided with additional handle grips 80 and 82 located at spaced intervals along the length of a handle 76. Like the handle grip 78, the handle grips 80 and 82 may be either solid or tubular in construction and may be secured in place on the handle 76 by welding, braising, or other similar, conventional techniques. Alternatively, the handle grips 80 and 82 may be secured in place using suitable fasteners.

Referring now to FIG. 6, there is shown a lifting device 88 comprising a fourth embodiment of the present invention. The lifting device 88 is similar in many respects to the lifting device 30 illustrated in FIGS. 1 and 2 and described hereinabove in conjunction therewith. Thus, the lifting device 88 includes a base 90 having a horizontal portion 92 and a vertical portion 93, a handle 94 extending upwardly from the base 90, and a handle grip 96 mounted on the handle 94.

The lifting device 88 differs from the lifting device 30 in that the handle grip 96 is slidably supported on the handle 94. The handle 94 is provided with a plurality of apertures 98 extending transversely therethrough. One or more pins 100 are received through the apertures 98 to secure the handle grip 98 in an appropriate position relative to the base 90. It will be understood that the positioning of the handle grip 96 relative to the base 90 will depend upon the particular application of the lifting device 88.

FIG. 7 illustrates a lifting device 106 which is similar in many respects to the lifting device 30 illustrated in FIGS. 1 and 2 and described hereinabove in conjunction therewith, and which is also similar in many respects to the lifting device 88 shown in FIG. 6 and described hereinabove in conjunction therewith. Thus, the lifting device 106 includes a base 108 having a horizontal portion 110 and a vertical portion 112, a handle 114 extending upwardly from the base 108, and a handle grip 116 slidably supported on the handle 114.

The handle 114 has a plurality of apertures 118 extending transversely therethrough. One or more pins 120 are received through selected apertures 118 of the handle 114 and are used to secure the handle grip 116 at a desired location on the handle 114 relative to the base 108. The handle 116 comprises a ring 122 which is slidably supported on the handle 114 and which is positionable relative to the handle 114 by the pins 120. The ring 122 has a rod 124 slidably received therein. The rod 124 may be either solid or tubular in construction. It will be appreciated that the precise positioning of the handle grip 116 relative to the base 108 depends upon the particular application of the lifting device 106.

Referring now to FIGS. 8A and 8B, there is shown a lifting device 130 comprising a sixth embodiment of the present invention. The lifting device 130 is similar in many respects to the lifting device 30 illustrated in FIGS. 1 and 2 and described herein above in conjunction therewith, and is also similar in many respects to the lifting device 88 illustrated in FIG. 6 and described hereinabove in conjunction therewith. Thus, the lifting device 130 includes a base 132 having a horizontal portion 134 and a vertical portion 136. A handle 138 extends upwardly from the base 132 and a handle grip 140 is mounted on the handle 138.

The handle 138 is provided with a knob or plate 142 at the upper end thereof. The knob or plate 142 is characterized by a predetermined diameter. The handle grip 140 is tubular in construction and is provided with a pair of apertures formed in the top and bottom sides thereof. The aperture formed in the bottom side of the handle grip 140 has an inside diameter which is closely matched to the outside diameter of the handle 138. As is best shown in FIG. 8B, the aperture 144 formed in the topside of the handle grip 142 has an inside diameter which is slightly larger than the outside diameter of the knob or plate 142. This relationship allows the top side of the handle grip 140 to be positioned above the knob or plate 142, thereby allowing a rod 146 to be received through the handle grip 140. However, the relatively small diameter of the aperture formed in the bottom side of the handle grip 140 prevents the handle grip 140 from being removed entirely from the handle 138.

Referring again to FIG. 8A, the handle 138 has a plurality of apertures 148 extending transversely therethrough. One or more pins 150 are received in selected apertures 148 to secure the handle grip 140 at a suitable location on the handle 138 relative to the base 132. The positioning of the handle grip 140 relative to the base 132 depends upon the particular application of the lifting device 130.

FIG. 9 shows a lifting device 156 comprising a seventh embodiment of the invention. The lifting device 156 is similar in many respects to the lifting device 30 illustrated in FIGS. 1 and 2 and described hereinabove in conjunction therewith. Thus, the lifting device 156 includes a base 158 comprising a horizontal portion 160 and a vertical portion 162. A handle 164 extends upwardly from the base 158. A handle grip 166 is provided at the upper end of the handle 164.

The lifting device 156 differs from the lifting device 30 in that it is provided with a plurality of threaded connections 168 each comprising a male threaded member 170 and a female threaded member 172. The male threaded members 170 comprising each of the threaded connections 168 are identical one to the other, and the female threaded members 172 comprising the several threaded connections 168 are identical ones to the other. Thus, any of the male threaded members 170 is selectively engageable with any of the female threaded members 172. In this manner the handle grip 166 may be positioned as close to or as far from the base 158 as may be required by a particular application of the lifting device 156.

FIG. 10 illustrates the use of the embodiments of the invention illustrated in FIGS. 4, 5, 6, 7, 8a and 8b, and 9. Whenever lifting devices incorporating the present invention are utilized to move objects up and down stairs, inclines, etc., it is desirable to position the handle grip of the lifting device situated at the low end of the stairs, etc. relatively close to the object to be lifted, and it is likewise desirable to position the handle grip of the lifting device situated at the upper end of the stairs, etc. relatively distant from the object to be lifted. Any of the lifting devices of FIGS. 4, 5, 6, 7, 8A and 8B, and/or 9 is suitable for this purpose.

FIG. 11 illustrates a lifting device 180 which is similar in many respects to the lifting device 30 illustrated in FIGS. 1 and 2 and described hereinabove in conjunction therewith. Thus, lifting device 180 includes a base 182 including a vertical portion 186 and horizontal portion 184, a handle 188, and a handle grip 190 secured to the upper end of the handle 188. The lifting device 180 differs from the lifting device 30 in that the handle grip 190 is ring-shaped. It will be understood that the precise dimensions and shape of the ring-shaped handle grip 190 of the lifting device 180 may be varied in accordance with the requirements of particular applications of the invention.

FIG. 12 illustrates a lifting device 194 which is similar in many respects to the lifting device 30 illustrated in FIGS. 1 and 2 described hereinabove in conjunction therewith. Thus, the lifting device 194 includes a base 196 comprising a horizontal portion 198 and a vertical portion 200, a handle 202, and a handle grip 204. In the embodiment of the invention illustrated in FIG. 12 the handle grip 204 comprises a D-shaped handle grip of the type commonly utilized in conjunction with shovels, and the like. It will be appreciated that the precise dimensions and shape of the D-shaped handle grip 204 of the lifting device 194 can be varied in accordance with the requirements of particular applications of the invention.

FIG. 13 illustrates a lifting device 210 which is similar in many facts to the lifting device 30 illustrated in FIGS. 1 and 2 and described hereinabove in conjunction therewith. Thus, the lifting device 210 includes a base 212 including a horizontal portion 214 and a vertical portion 216. A handle 218 extends upwardly from the base 212, and a handle grip 220 is secured to the upper end of the handle 218.

The lifting device 210 differs from the lifting device 30 of FIGS. 1 and 2 in that the handle 218 includes an upper angularly offset portion 222. The angularly offset portion 222 of the handle 218 extends in the direction which is directly opposite from the direction of the horizontal portion 214 of the base 212 relative to the vertical portion 216. This allows a person utilizing the lifting device 210 to be situated further from the object to be lifted than would otherwise be possible.

Referring to FIG. 14, there is shown a lifting device 226 which is similar in some respects to the lifting device 30 illustrated in FIGS. 1 and 2 and described hereinabove in conjunction therewith. Thus, the lifting device 226 includes a base 228 comprising a horizontal portion 230 and a vertical portion 232. A handle 234 extends upwardly from the base 228, and a handle grip 236 is secured at the upper hand of the handle 234. The lifting device 226 differs from the lifting device 30 in that the horizontal portion 230 of the base 228 of the lifting device 228 includes extensions 238 situated at the opposite ends thereof. The extensions 238 of the base 228 of the lifting device 226 are very useful in certain applications of the invention wherein increased stability of the object supported on the lifting device is important to the successful use of the invention.

The extensions 238 may be provided with connection holes 239. The holes 239 receive small screws or bolts to connect the lifting device 226 to an identical lifting device in accordance with particular applications of the invention.

FIG. 15 illustrates an eighth embodiment of the present invention. A lifting device 250 is similar in some respects to the lifting device 30 illustrated in FIGS. 1 and 2 and described hereinabove in connection therewith. Thus, the lifting device 250 includes a base 252 comprising a horizontal portion 254 and a vertical portion 256. One or more handles 258 extend upwardly from the base 252. A handle grip 260 is secured at the upper end of each handle 258. The lifting device 250 differs from the lifting device 30 in that the base 252 includes a bracket 261 extending from the vertical portion 256 in the opposite direction from that of the horizontal portion 254. The bracket 261 has a plurality of apertures 262 formed therethrough. Each aperture 262 is adapted to receive, in a sliding but close fitting relationship, one of the handles 258. The handles 258 may be threadedly engaged with the apertures, if desired. Alternatively, conventional fasteners 264, for example, threaded fasteners, are received in apertures 266 and are used to secure the handles 258 in the apertures 262.

The embodiment of the invention comprising the lifting device 250 may be utilized in two distinct modes. In one mode, handles 258 are received and secured in apertures 262 located at the opposite ends of the base 252. The lifting device 250 is thus configured for use by two individuals, each aligned with and engaging one of the handles 258. Typically, the lifting device 250 would be used in conjunction with an identical lifting device similar to the manner illustrated in FIG. 3 in conjunction with the lifting device 30. This would allow four persons to lift and move a relatively heavy object. In the other mode, only one handle 258 is used. The single handle 258 is secured in the center aperture 262 by means of an appropriate fastener 264. In such mode, the lifting device 250 functions virtually identically to lifting device 30 as illustrated in FIG. 3 and described hereinabove in conjunction therewith.

FIG. 16 illustrates a pair of lifting devices 270 in comprising a variation of the lifting device 228 illustrated in FIG. 14 and described hereinabove in conjunction therewith. Thus, each of the lifting devices 270 includes a base 272 including a horizontal portion 274 and a vertical portion 276. The horizontal portion 274 of each base 272 includes extensions 278 projecting from the opposite ends thereof to provide additional stability for objects carried by the lifting device. Each lifting device 270 is provided with a pair of handles 280 secured to and extending upwardly from the opposite ends of the base 272. A handle grip 282 is secured at the upper end of each handle 280. The handle grips 282 are tubular in construction and are thus adapted to receive a rod 284 extending therethrough. By means of the rod 284, the lifting devices 270 are adapted by actuation by two, four or six persons depending on the weight of the object to be lifted and transported.

Figure 17:
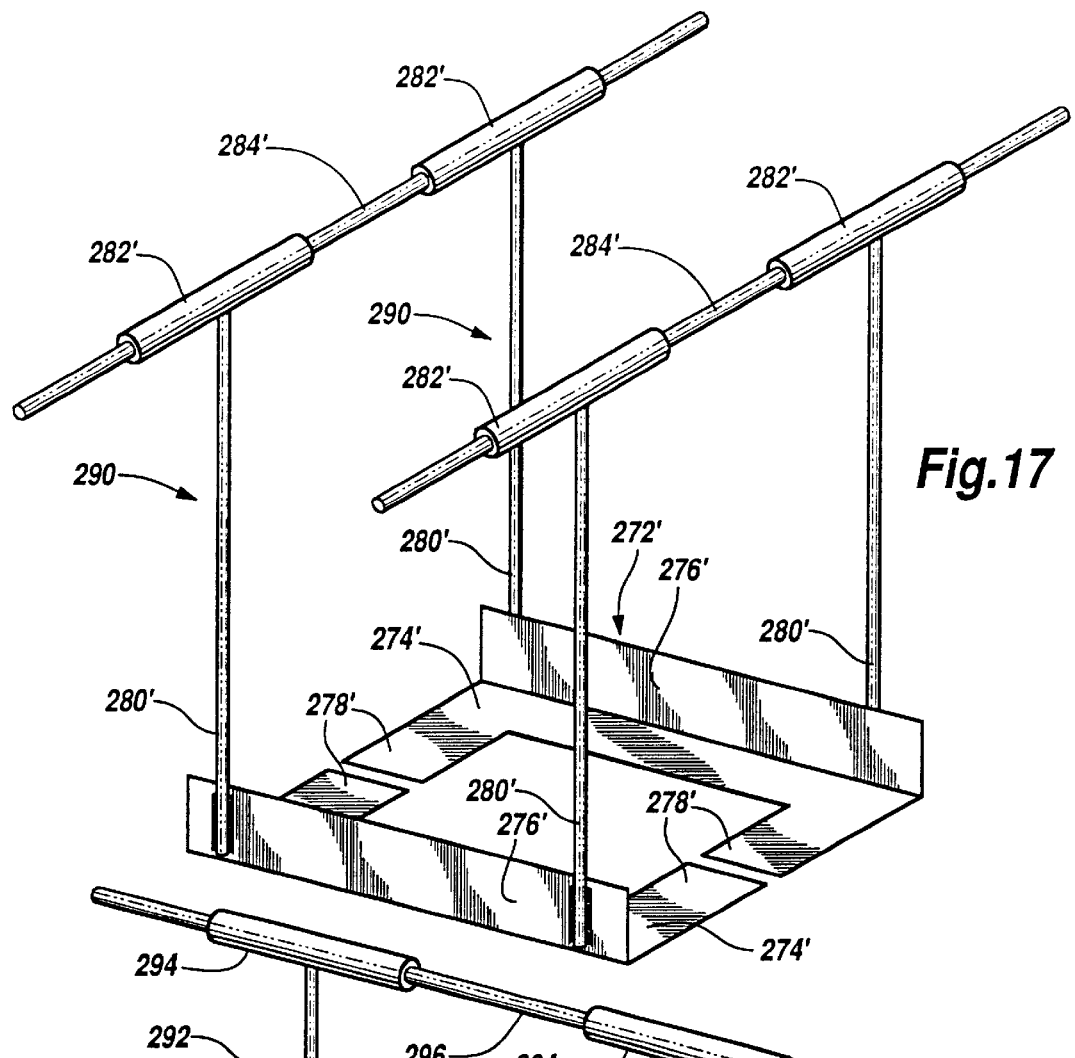
FIG. 17 is a perspective view illustrating a variation of the embodiment of the invention shown in FIG. 16.

FIG. 17 illustrates a pair of lifting devices 290 comprising numerous component parts which are substantially identical in construction and function to the component parts of the lifting devices 270 illustrated in FIG. 16 and described hereinabove in conjunction therewith. Such identical component parts are designated in FIG. 17 with the same reference numerals utilized above for the description of the lifting devices 270, but are differentiated therefrom by prime (') designations. The lifting devices 290 are virtually identical to the lifting devices 270 except that the handle grips 282' are oriented perpendicularly to the base 272', rather than parallel thereto as is the case with the handle grips 282 of the lifting devices 270. Thus, the rods 284' extend parallel to the extensions 278' of the base 272' rather than extending parallel to the vertical portion 276' of the bases as is the case with the lifting devices 270. Such orientation may be more convenient in certain applications of the invention. Those skilled in the art will appreciate the fact that the handle grips 282 of the lifting devices 270 and/or the handle grips 282' of the lifting devices 290 may be pivotally supported on their respective handles, in which case the lifting devices 270 and 290 are virtually identical.

Figure 18:
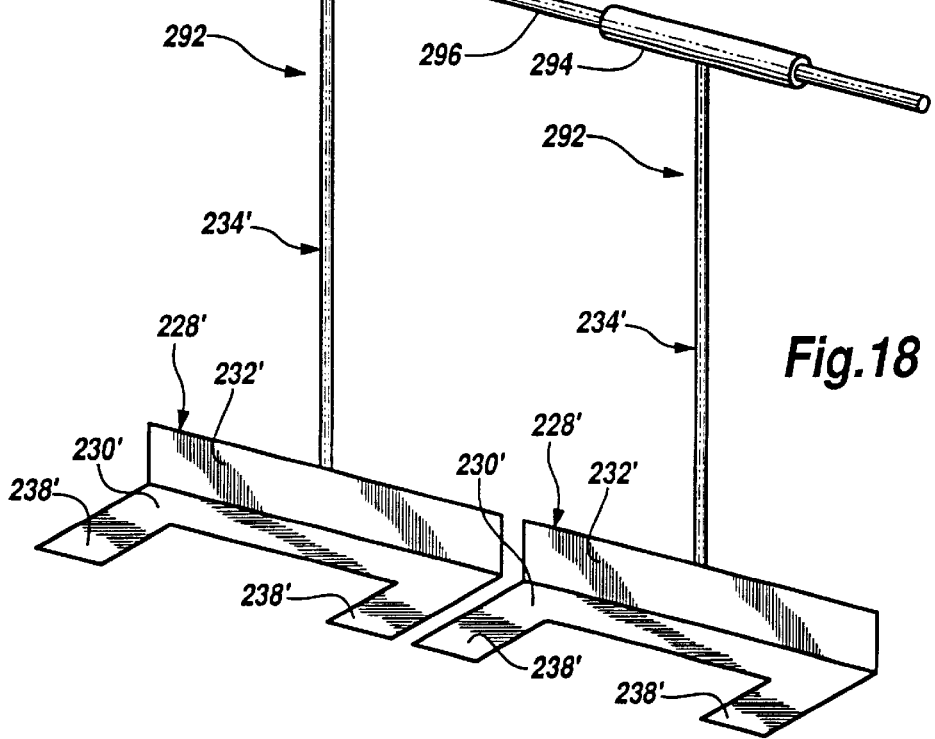
FIG. 18 is a perspective view illustrating a variation of the embodiment of the invention shown in FIG. 14.

FIG. 18 illustrates a pair of lifting devices 292, each incorporating numerous component parts which are substantially identical in construction and function to component parts of the lifting device 226 illustrated in FIG. 14. Such identical component parts are designed in FIG. 18 with the same reference numeral utilized hereinabove in conjunction with the description of the lifting device 226, but are differentiated therefrom by means of prime (') designations. The lifting devices 292 of the FIG. 18 differ from the lifting device 226 of FIG. 14 in that the lifting devices 292 are provided with handle grips 294 which are tubular in construction. This permits the use of a rod 296 received through the handle grips 294 to connect the lifting devices 292 one to the other. This facilitates the use of the lifting devices 292 by two or more persons to lift and move heavy objects.

Figure 19:
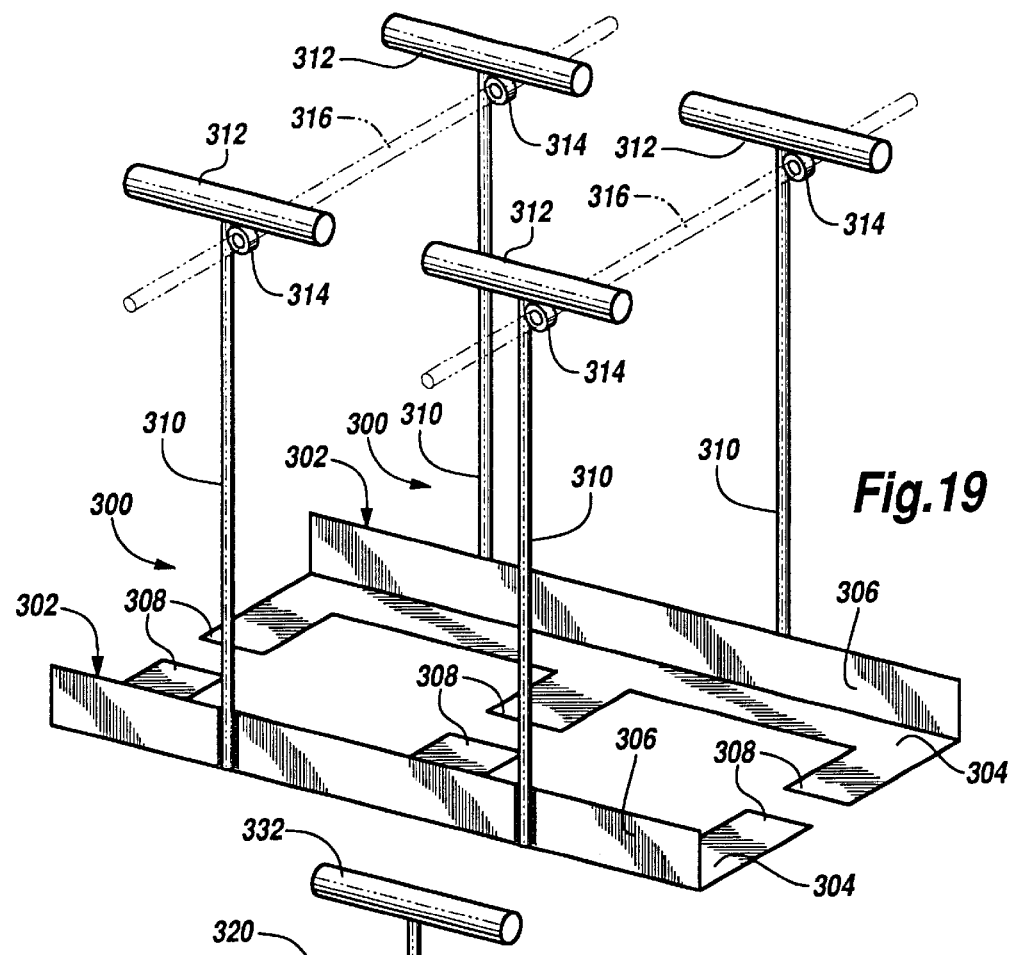
FIG. 19 is a perspective view illustrating a tenth embodiment of the invention.

FIG. 19 illustrates a lifting device comprising a tenth embodiment of the invention. A pair of lifting devices 300 each include a base 302 comprising a horizontal portion 304 and a vertical portion 306. The horizontal portion 304 of each base 302 is provided with a plurality of extensions 308 which function to stabilize objects lifted by the lifting devices 300.

A pair of handles 310 extend upwardly from each base 302 and a handle grip 3312 is secured to the upper end of each handle 310. The handle grips 312 may be either solid or tubular in construction. A ring 314 is secured at the corner between each handle 310 and the associated handle grip 312. The rings 314 are adapted to receive rods 316.

Each lifting device 300 is adapted for use by two or more persons. Ordinarily, each pair of persons will engage the handle grips 312 of one of the lifting devices 300 and work in tandem with another pair of persons engaging the handle grips 312 of the opposite lifting device 300 to lift and transport the load supported on the horizontal portions 304 and the extensions 308 of the bases 302. In certain circumstances it may be desirable to use the bars 316 extending through the rings 314 to better facilitate lifting and transport of the loads supported by the lifting devices 300.

Figure 20:
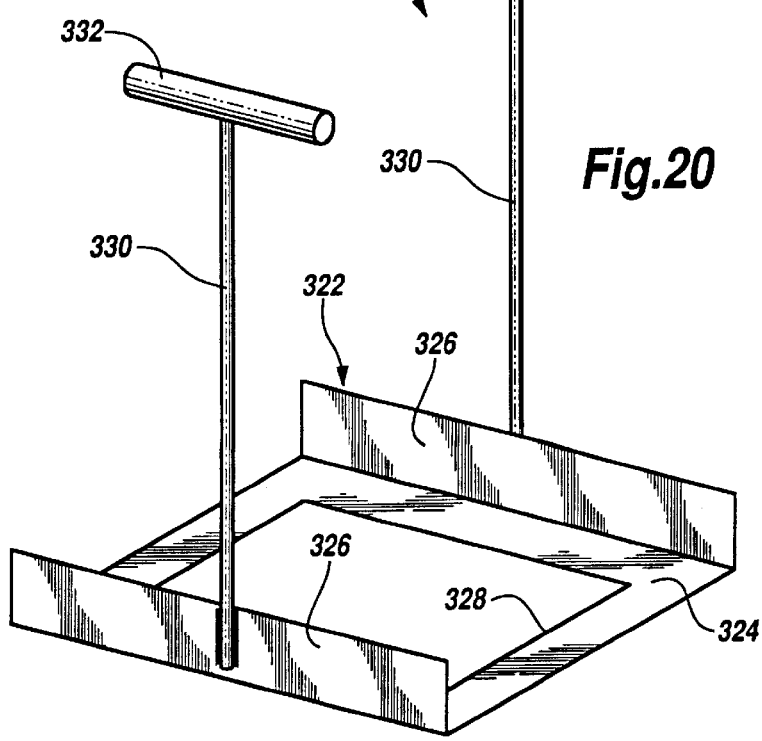
FIG. 20 is a perspective view illustrating a eleventh embodiment of the invention.

FIG. 20 depicts a lifting device 320 comprising an eleventh embodiment of the invention. The lifting device 320 comprises a base 322 including a planar horizontal portion 324 and vertical portion 326. The horizontal portion 324 may be provided with a central aperture 328; however, the aperture 328 may be omitted depending on the requirements of particular applications of the invention. A pair of handles 330 extend upwardly from the vertical portion 326 and a handle grip 332 is secured to the distal end of each handle 330. The handle grips 332 may be either solid or tubular in construction, and may be mounted for pivotal movement about the axes of the handles 330, if desired.

The lifting device 320 is adapted for operation by two persons who engage the handle grips 332 to effect lifting and movement of objects carried by the lifting device 320. The use of the lifting device 320 may be advantageous with respect to the use of the lifting device 30 of FIGS. 1 and 2, for example, due to the fact that the base 322 comprises a single, solid member which prevents separation between the vertical members 326 located on opposite sides of the object being lifted and transported by the lifting device 320.

Referring to FIG. 21, there is shown a lifting device 340 comprising a variation of the lifting device 250 illustrated in FIG. 15. Many of the component parts of the lifting device 340 are identical to component parts of the lifting device 250 as illustrated in FIG. 15 and described hereinabove in conjunction therewith. Such identical component parts are designated in FIG. 21 with the same reference numerals utilized in the description of a lifting device 250, but are differentiated therefrom by means of a prime (') designation. The primary distinction between the lifting device 250 and the lifting device 340 comprises the fact that the lifting device 340 includes a base 252' having a horizontal portion 342 which extends between and interconnects two vertical portions 256'. Thus, the horizontal portion 342 serves to prevent separation between the vertical portions 256', thereby adding stability to the lifting device 340. Conversely, the horizontal portion 342 fixes the separation between the vertical portions 256', thereby defining a practical limit to the size of objects that can be lifted by the lifting device 340.

FIGS. 22 and 23 illustrate a lifting device 348 comprising a variation of the lifting device 30 illustrated in FIGS. 1 and 2. Many of the component parts of the lifting device 348 are identical in construction and function to the component parts of the lifting device 30 and are identified in FIGS. 22 and 23 by the same reference numerals utilized in conjunction with the description of the lifting device 30, but are differentiated therefrom by means of a prime (') designation.

The lifting device 348 is differentiated from the lifting device 30 primarily by the fact that the horizontal portions 34' of the base 32' are provided with apertures 350. An auxiliary base 352 includes a horizontal portion 354 and a vertical portion 356. The horizontal portion 354 is provided with aperture 360 which are aligned with the apertures 350 to receive small screws or bolts, thereby securing the auxiliary base 352 in engagement with the base 32'. The resulting construction is illustrated in FIG. 23.

The use of the lifting device 348 is particularly advantageous when it is desired to lift and transport objects such as logs, lumber, pipe, and other elongated objects. Such objects can often be carried by a single person using a single lifting device if facilities are provided from preventing the objects from disengagement from the lifting device. The auxiliary base 352 of the lifting device 348 serves this function in that it prevents disengagement of a carried object such as the log L illustrated in FIG. 23 from the lifting device 348.

Figure 25:
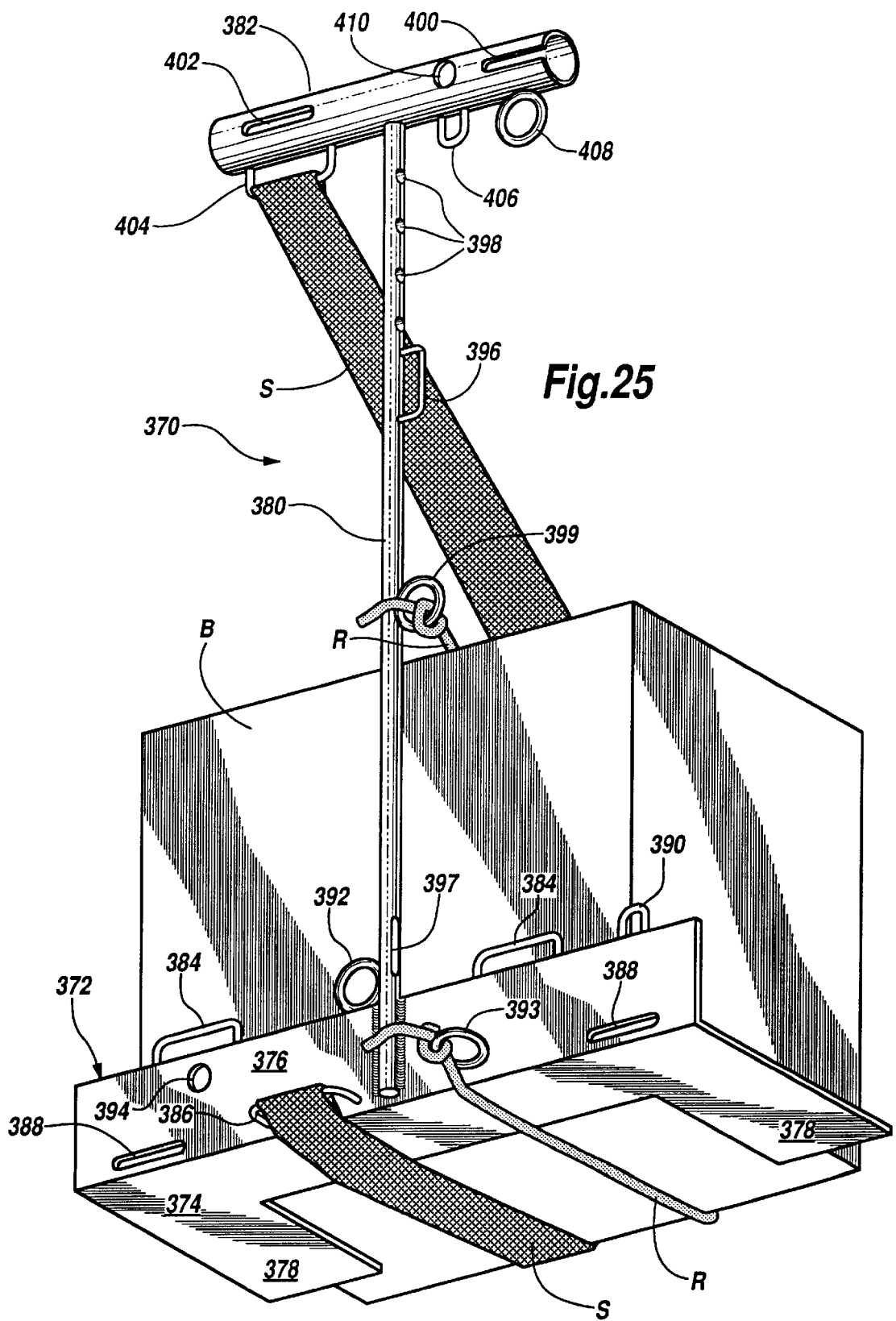

Referring to FIGS. 24 and 25, it is often possible to lift and transport relatively light-weight objects using a single lifting device incorporating the present invention. In such circumstances, it is desirable to use a strap or a rope to secure the object to the lifting device in order to prevent disengagement therebetween. Referring particularly to FIG. 24, a lifting device 370 includes a base 372 comprising a horizontal portion 374 and a vertical portion 376. The horizontal portion 374 is provided with extensions 378 located at the opposite ends thereof. A handle 380 extends upwardly from the base 372. A handle grip 382 is secured at the distal end of the handle 380. The handle grip 382 may either be solid or tubular in construction.

The base 372 is provided with U-shaped brackets 384 secured to the upper edge of the vertical portion 376 and a U-shaped bracket 386 secured to the rear surface of the vertical portion 376. Also, slots 388 are formed through the vertical portion 376 of the base 372. The brackets 384 and 386 and the slots 388 are all designed and adapted to receive and secure cargo straps therethrough.

The base 372 is further provided with a U-shaped ring 390 and a round ring 392, each secured to the upper edge of the vertical portion 376. A round ring 393 is mounted on the vertical portion 376. A round aperture 394 extends through the vertical portion 376. The rings, 390, 392, and 393 and the aperture 394 are all adapted to receive and secure ropes to the base 372 of the lifting device 370.

The handle 380 is provided with a U-shaped bracket 396 and a slot 397 adapted to receive and secure straps therethrough, and holes 398 adapted to receive and secure ropes therethrough. A rope receiving ring 399 is also provided on the handle 380.

The handle grip 382 is provided with an open-ended slot 400, a closed-ended slot 402 and a U-shaped bracket 404, each adapted to receive and secure a cargo strap therethrough. The handle grip 382 is further provided with a U-shaped ring 406, a round ring 408, and an aperture 410, all designed and adapted to receive and secure ropes to the handle grip 482.

It will be understood by those skilled in the art that the brackets, slots, rings, and apertures 384, 386, 388, 390, 392, 393, 394, 396, 397, 398, 399, 400, 402, 404, 406, 408, and 410 are representative only. In the practice of the invention, brackets, rings, slots, and apertures of any desired shape and size can be provided at any desired location on any of the various lifting devices comprising the present invention for the purpose of receiving and securing any selected size or shape of strap or rope, which in turn secures an object to be lifted to the lifting device.

Referring now to FIG. 25, a box B is shown supported on the base 372 of the lifting device 370 and is positioned in engagement with the horizontal portion 374, the vertical portion 376, and the extensions 378 of the base 372. A strap S is secured between one of the brackets 386 and the bracket 404, and functions to secure the Box B and engagement with the base 372 of the lifting device 370. Alternatively, a rope R is secured between ring 393 and ring 399 and functions to secure the box B to the base 372 of the lifting device 370. The straps and ropes may also be used to secure two lifting devices incorporating the invention one to the other.

Although preferred embodiments of the invention have been illustrated in the accompanying drawings and described in the foregoing detailed description, it will be understood that the invention is not limited to the embodiment disclosed but is capable of numerous rearrangements, modifications, and rearrangements of parts and elements without departing from the spirit of the invention.

I claim:

1. A lifting or carrying device comprising:
   a) a base including a substantially horizontal portion for engagement with an object to be lifted or carried and a substantially vertical portion secured to the substantially horizontal portion;
   b) a handle secured to the base and extending substantially vertically upward from the substantially vertical portion thereof, said handle being formed of a plurality of disconnectable sections; and
   c) a handle grip for selective actuation to impose a substantially vertically directed force on the handle and the base thereby lifting an object positioned in engagement with the substantially horizontal portion of the base, said handle grip having a center point, one of said plurality of disconnectable sections being connected to said handle grip at generally said center point.

2. A lifting or carrying device, comprising:
   a) a base including a substantially horizontal portion for engagement with an object to be lifted or carried and a substantially vertical portion secured to the substantially horizontal portion and extending substantially perpendicular thereto, said substantially horizontal portion forming a lowermost portion of the lifting device or carrying device, said substantially vertical portion extending in a substantially vertical plane;
   a handle secured to the base and extending substantially vertically upward from the substantially vertical portion thereof, said handle having a longitudinal axis; said handle being disposed such that it does not traverse said substantially vertical plane, said handle further extending along said substantially vertical portion and,
   c) a handle grip for selective gripping to impose a substantially vertically directed force on the handle and the base thereby lifting an object positioned in engagement with the base, said handle grip having a center point, said handle being secured to said handle grip proximate to said center point.

3. A lifting device according to claim 2, wherein:
   a) said substantially horizontal portion has a length greater than said handle grip.

4. A lifting device according to claim 2, wherein:
   a) said substantially horizontal portion is flat.

5. A lifting device according to claim 2, wherein:
   a) said handle is secured only to a rear surface of said substantially vertical portion.

6. A lifting device according to claim 2, further including:
   a) means for adjusting the position of said handle grip relative to said base.

7. A lifting device according to claim 2, wherein:
   a) said handle includes a plurality of disconnectable segments.

8. A lifting device according to claim 2, further including:
   a) a plurality of handle grips.

9. A lifting or carrying device, comprising:
   a) a base including a substantially horizontal portion for engagement with an object to be lifted or carried and a substantially vertical portion secured to the substantially horizontal portion and extending substantially perpendicular thereto, said substantially horizontal portion forming a lowermost portion of the lifting device or carrying device, said substantially vertical portion having front and rear surfaces;
   b) a handle secured to the base and extending substantially vertically upward from the substantially vertical portion thereof, said handle including a shaft having a longitudinal axis; said handle touching said substantially vertical portion at only one of said front and rear surfaces, and
   c) a handle grip mounted on the handle for selective gripping to impose a substantially vertically directed force on the handle and the base thereby lifting an object positioned in engagement with the base, said handle grip being disposed substantially symmetrically about the longitudinal axis of said shaft.

10. A method of carrying or lifting a device:
    a) providing a first lifting or carrying device having a base, a handle and a handle grip, the base including a substantially horizontal portion for engagement with an object to be lifted or carried and a substantially vertical portion secured to the substantially horizontal portion and extending substantially perpendicular thereto, the substantially horizontal portion forming a lowermost portion of the first lifting or carrying device, the handle having a shaft secured to the base and extending substantially vertically upward from the substantially vertical portion of the base, the handle grip being substantially symmetrically disposed relative to the shaft of the handle;
    b) providing a second lifting or carrying device having a base, a handle and a handle grip, the base including a substantially horizontal portion for engagement with an object to be lifted or carried and a substantially vertical portion secured to the substantially horizontal portion and extending substantially perpendicular thereto, the substantially horizontal portion forming a lowermost portion of the second lifting or carrying device, the handle having a shaft secured to the base and extending substantially vertically upward from the substantially vertical portion of the base, the handle grip being substantially symmetrically disposed relative to the shaft of the handle;
    c) positioning the substantially horizontal portion of the first lifting device under a first portion of the object to be lifted or carried;
    d) positioning the substantially horizontal portion of the second lifting device under a second portion of the object to be lifted or carried;
    e) gripping the handle grip of the first lifting device to apply a lifting or carrying force to the first lifting or carrying device; and,
    f) gripping the handle grip of the second device to apply a lifting or carrying force to the second lifting or carrying device.

* * * * *